March 12, 1940. K. L. CURTIS Re. 21,387
PROJECTION SYSTEM
Original Filed June 12, 1930 5 Sheets-Sheet 1
Fig. 1.
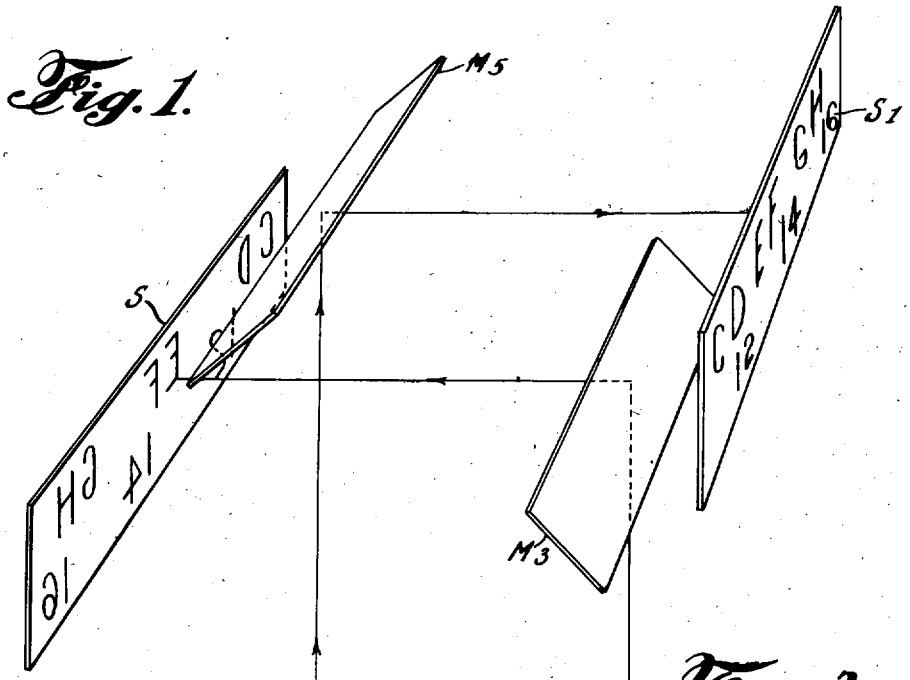
Fig. 3.
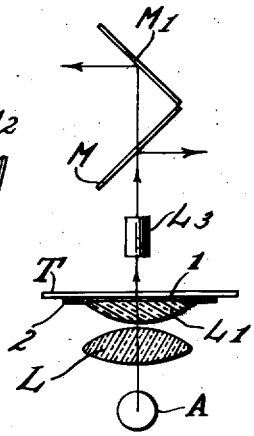
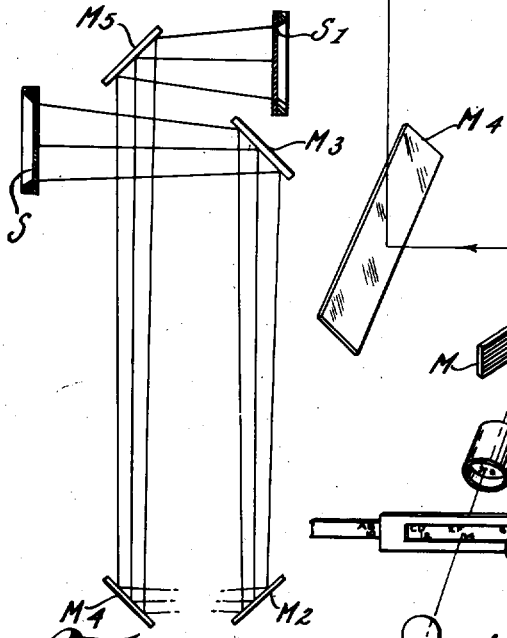
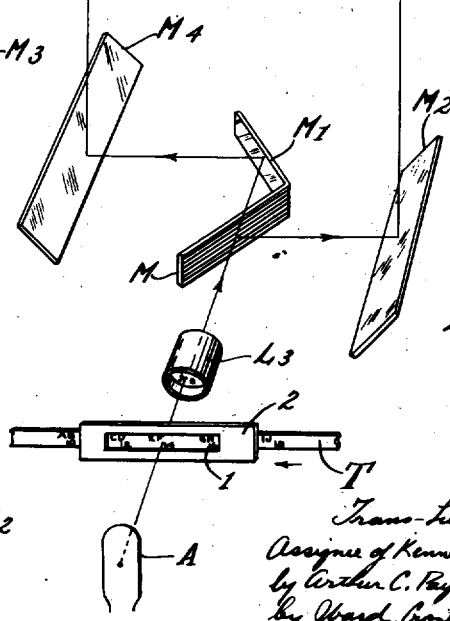
Fig. 2.
Trans-Lux Corporation,
Assignee of Kenneth L. Curtis, Deceased,
by Arthur C. Payne, Vice-President,
by Obard, Crosby & Neal, Attorneys.

March 12, 1940. K. L. CURTIS Re. 21,387
PROJECTION SYSTEM
Original Filed June 12, 1930 5 Sheets-Sheet 2
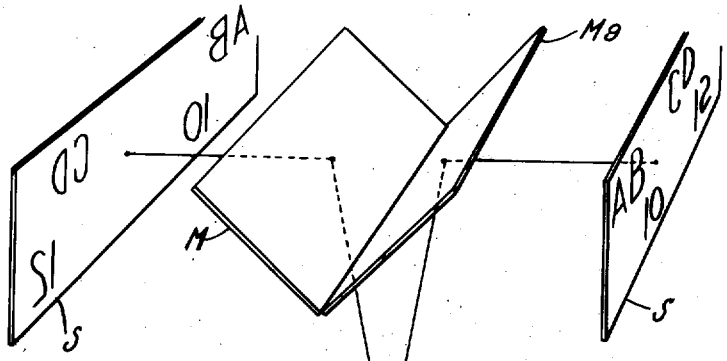
Fig. 4.
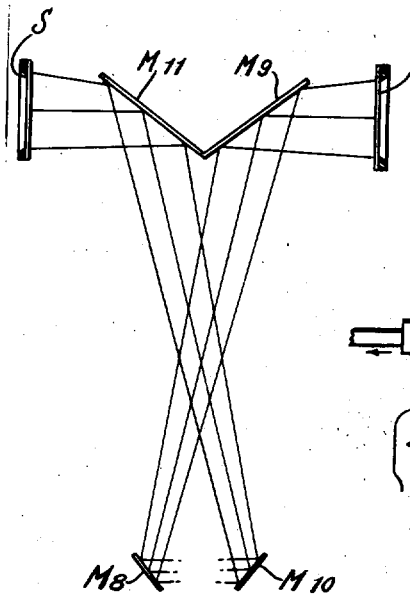
Fig. 5.
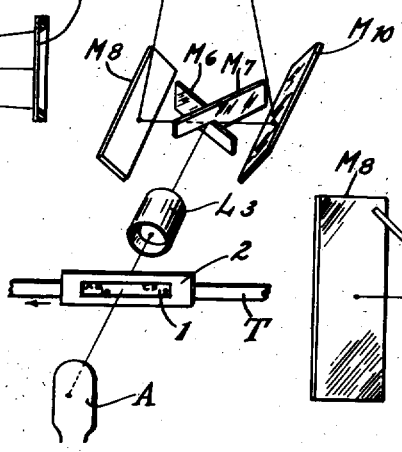
Fig. 6.
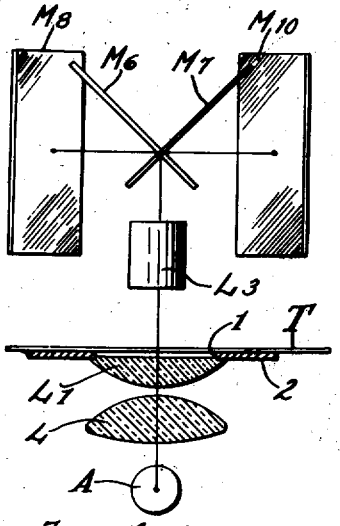
Trans-Lux Corporation,
Assignee of Kendall L. Curtis, Deceased,
by Arthur C. Payne, Vice-President,
by Ward, Crosby & Neal, Attorneys.

March 12, 1940. K. L. CURTIS Re. 21,387

PROJECTION SYSTEM

Original Filed June 12, 1930 5 Sheets-Sheet 3

Translux Corporation,
Assignee of Kenneth L. Curtis, Deceased,
by Arthur C. Payne, Vice-President,
by Ward, Crosby & Neal, Attorneys.

March 12, 1940. K. L. CURTIS Re. 21,387

PROJECTION SYSTEM

Original Filed June 12, 1930 5 Sheets-Sheet 4

Trans-Lux Corporation,
Assignee of Kenneth L. Curtis, Deceased,
by Arthur C. Pryor, Vice-President,
by Ward, Crosby & Heal, Attorneys.

March 12, 1940. K. L. CURTIS Re. 21,387
PROJECTION SYSTEM
Original Filed June 12, 1930 5 Sheets-Sheet 5
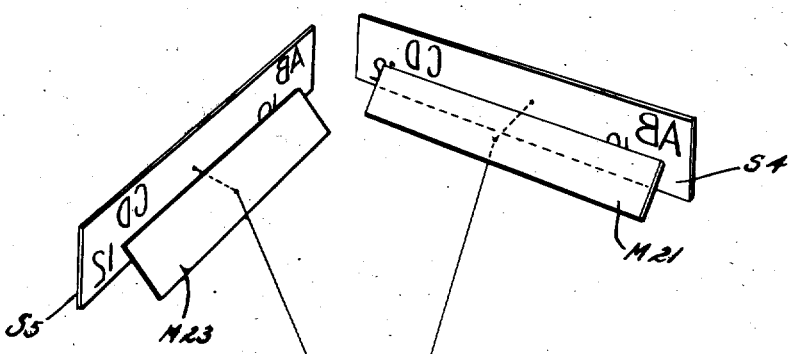
Fig. 12.
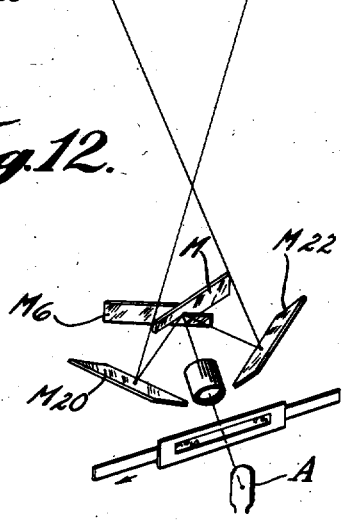
Fig. 13.
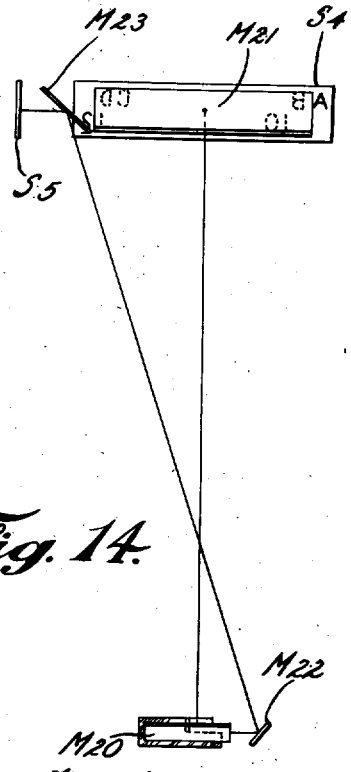
Fig. 14.
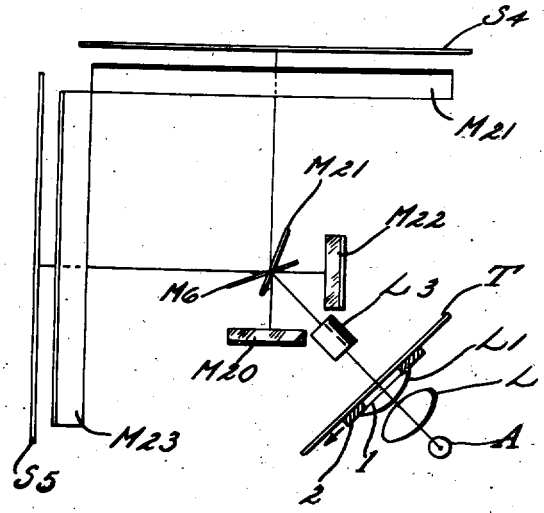
Trans-Lux Corporation,
Assignee of Kenneth L. Curtis, Deceased,
by Arthur C. Ryan, Vice-President,
by Ward, Crosby & Neal, Attorneys.

Reissued Mar. 12, 1940

Re. 21,387

UNITED STATES PATENT OFFICE 21,387

PROJECTION SYSTEM

Kenneth L. Curtis, deceased, late of New York, N. Y., by Trans-Lux Corporation, New York, N. Y., assignee Original No. 2,051,593, dated August 18, 1936, Serial No. 460,571, June 12, 1930. Application for reissue June 10, 1938, Serial No. 213,100

23 Claims. (Cl. 88—24)

My invention relates to a projection system for obtaining single or duplicate images of characters or representations formed on or borne by a tape, or equivalent.

My invention, in one prominent phase thereof, relates to a projecting system wherein the projecting light beam coacts with a character-bearing tape section to simultaneously produce duplicate images of the same character.

My invention, in another prominent phase thereof, relates to a projection system wherein independent light beams are obtained from a single projected light beam and passed to screens, respectively, preferably by similar light-reflecting systems.

My invention relates to a projection system, as aforesaid, wherein the light-reflecting arrangement is of simple character and of high efficiency.

Various other objects and characteristics of my invention will become apparent from the following description taken in connection with the accompanying drawings.

My invention resides in the projection system, light-reflecting system, the arrangement for obtaining upright images on one or more screens, the features of construction and combination of parts of the character hereinafter described and claimed.

For an understanding of my invention and for an illustration of some of the many forms thereof, reference is to be had to the accompanying drawings, in which:

Figure 1 is a perspective view, with parts omitted, of a projection system arranged in accordance with my invention;

Fig. 2 is an elevational view of the duplicate light-reflecting systems of Fig. 1;

Fig. 3 is a plan view, partly in section, showing elements traversed by the single projected light beam of Fig. 1 prior to development of the same into independent light beams;

Fig. 4 is a perspective view, with parts omitted, of another projection system arranged in accordance with my invention;

Fig. 5 is an elevational view of the duplicate light-reflecting systems of Fig. 4;

Fig. 6 is a plan view, partly in section, showing elements traversed by the single projected light beam of Fig. 4 prior to development of the same into independent light beams;

Fig. 12 is a perspective view, with parts omitted, of another form of projection system arranged in accordance with my invention;

Fig. 13 is a plan view of the projection system shown in Fig. 12; and

Fig. 14 is a side elevational view of the projection system shown in Figs. 12 and 13.

Figure 7:
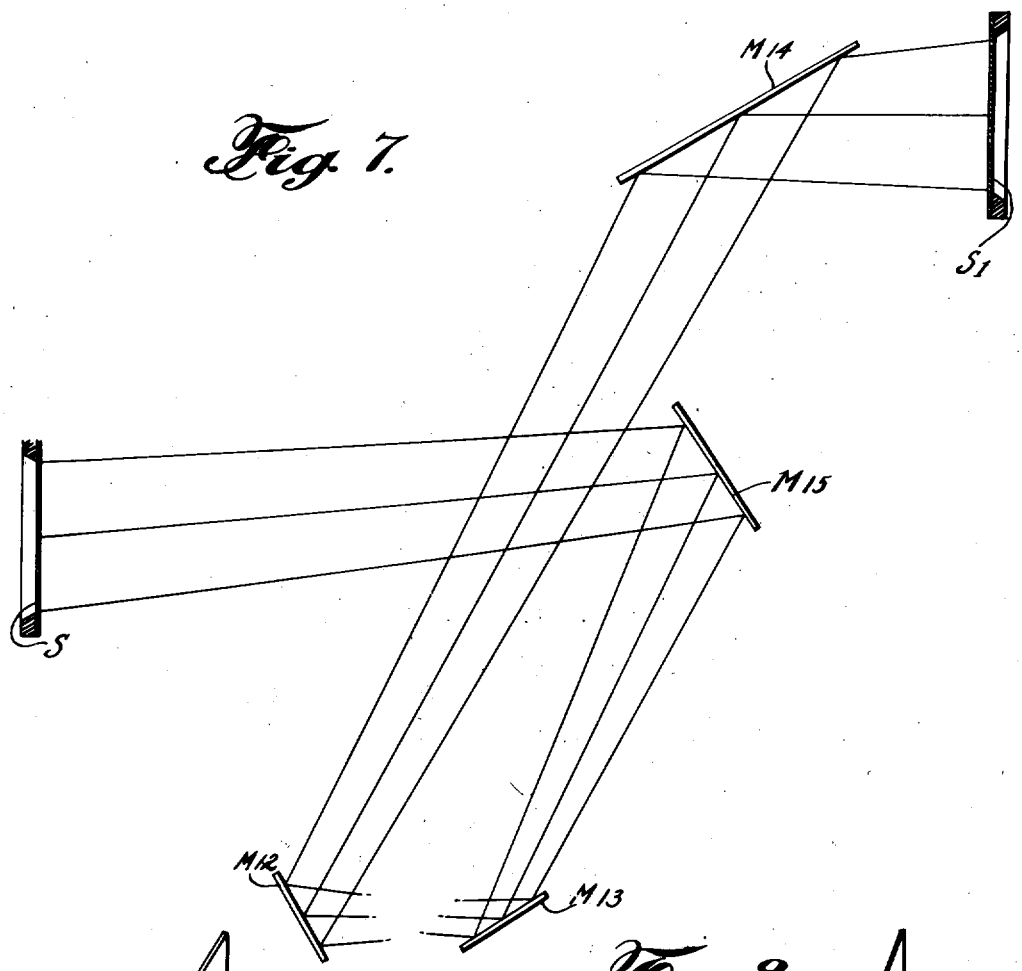
Fig. 7 is an elevational view showing another arrangement of duplicate light-reflecting systems.

Referring particularly to Figs. 1, 2 and 3, A represents any suitable source of light such, for example, as an incandescent electric lamp, light from which may traverse any suitable condensing lens system herein shown as comprising condensing lenses L and L1, the resultant projected light beam thereafter traversing any suitable projection field which herein is shown as defined by an aperture 1 formed in a member 2 forming, if desired, a part of the front wall of a suitable lens housing, not shown.

Beyond the projection field, the aforesaid light beam traverses any suitable objective or projection lens $L_0$ and then, in any suitable manner, is separated into a plurality of independent light beams. As herein shown, two light beams are obtained from the single light beam traversing the aperture 1 and to this end, with the form of my invention shown in Figs. 1, 2 and 3, a plurality of mirrors M and M1 are utilized, said mirrors being so disposed, preferably, that they are spaced along the axes of the projected light beam which coacts therewith approximately midway of their ends.

In accordance with the form of my invention illustrated in Figs. 1, 2 and 3, the mirror M is of such character that the projected light beam in part passes therethrough and in part is reflected thereby, the part passing and the part reflected, preferably being approximately equal although this may be varied if desired. The mirror M may be suitably silvered to effect the function just described or, as illustrated in Fig. 1, it may comprise alternate reflecting and transparent sections. The mirror M1 is fully reflecting since all of the projected light beam passing thereto should be reflected.

As shown, therefore, the projected light beam coacts with the two mirrors M and M1 whereby there are produced two independent light beams which may pass approximately in opposite directions with respect to each other preferably approximately at right angles with respect to the axis of said projected light beam. However, this arrangement may be varied as desired so that the two light beams may be obliquely related to each other and to the axis of said projected light beam in a desired manner.

With the form of my invention herein illustrated in Figs. 1–3, the projected light beam, while passing substantially in a horizontal direction, coacts with the mirror system comprising the mirrors M and M1, the latter preferably being so arranged that the respective independent light beams likewise pass in substantially horizontal directions.

In accordance with the form of my invention illustrated in Figs. 1, 2 and 3, the light beam reflected by the mirror M coacts in succession with mirrors M2 and M3 the former deflecting said last named light beam so that it passes approximately vertically and the latter returning said last named light beam approximately to a horizontal direction but in a direction the reverse of that taken under the influence of the mirror M. From the mirror M3, said last named light beam passes into coacting relation with a screen S.

In a manner similar to that described above, the light beam reflected by the mirror M1 passes approximately horizontally to a mirror M4, then approximately vertically to a mirror M5, and then approximately horizontally to a screen S1, said last named light beam passing approximately in opposite directions from the respective mirrors M1 and M5.

With the form of my invention shown, the screens S and S1 are of the character utilized with "through" projection or projection of that character wherein the light beams pass first through the respective screens and then reach the eyes of the audience. Accordingly it is the rear of the screens which the light beams first engage. As shown, the screens S and S1 are disposed substantially vertically and preferably they are in substantially parallel relation, the length of the light paths between each screen and the objective lens L3 being approximately equal.

In accordance with the form of my invention disclosed in Figs. 1, 2 and 3, the aforesaid member 2 is adapted to frame any suitable character-bearing surface or member such, for example, as a tape T of the character herein illustrated, this tape being such as customarily issues from stock "ticker" mechanism. As shown by Figs. 1 and 3, the section of the tape T in the projection field extends horizontally and is disposed in vertical edgewise relation, i. e., the flat section of the tape is disposed at right angles to the plane of the paper on which the drawing is made, Fig. 3. As illustrated, the tape characters AB, CD, etc. on the one hand and the tape characters 10, 12, etc. on the other hand form horizontal rows of characters on that tape section in the projection field, and the images of these characters form horizontal rows of images on the screen or screens. The tape T passes through the projection field in a direction from right to left, Figs. 1 and 3; it may issue from printing mechanism of any suitable character and it may be pulled or drawn through said projection field by any suitable mechanism. Thus, if desired, said tape may be drawn through the projection field in the manner described in my pending application Serial Number 441,963, filed April 5, 1930, and the lamp housing, condenser housing and allied apparatus may be of the character illustrated in Figs. 12–16 of my pending application, Serial Number 454,896, filed May 23, 1930. Or, apparatus for this purpose of any other suitable type may be utilized.

In accordance with my invention, that flat side of the tape T on which the characters are printed faces the source of light A. Under such circumstances, the disclosed mirror system causes the images of the tape characters within the projection field to appear on the respective screens in vertical upright position, said images moving in opposite directions across the respective screens and being readable by observation of the front of each screen. As will be obvious, duplicate images of each tape character within the projection field are simultaneously produced and these images appear, respectively, on the screens S and S1.

Referring to Figs. 4, 5 and 6, there is illustrated a plural-beam reflecting system the same in principle as that heretofore described but differing therefrom in some respects.

In Figs. 4, 5 and 6, the source of light, the projection field, the tape and the objective lens L3 are the same and related the same as heretofore described. However, in lieu of the above described mirror system for obtaining independent light beams from the projected light beam, there are utilized crossed mirrors M6 and M7 which may be supported, and related to each other and to the objective lens L3 the same as described in connection with the crossed mirrors illustrated and described in my aforesaid pending application Serial Number 454,896.

As shown, although not necessarily, the mirrors M6 and M7 are arranged at angles of 45 degrees with respect to the axis of the projected light beam passing from the objective lens L3 whereby the independent light beams pass laterally in opposite directions from the axis of said projected light beam.

From the mirror M6, one of the independent light beams passes more or less horizontally to a mirror M8 and then more or less vertically to a mirror M9, the latter reflecting said light beam preferably in a horizontal direction to the screen S1. Similarly, the other independent light beam passes more or less horizontally to a mirror M10, then more or less vertically to a mirror M11, and then preferably substantially horizontally to the screen S, said screens being adapted for through projection and arranged approximately the same as heretofore described.

The system of Figs. 4, 5 and 6 operates the same as heretofore described in connection with Figs. 1, 2 and 3. Under some circumstances, the utilization of the crossed mirrors M6 and M7 is advantageous because, by them, the independent light beams are laterally deflected at equal distances from the objective lens L3 whereas, with the arrangement of Figs. 1, 2 and 3, the lateral deflection of the independent light beams occurs at unequal distances from the objective lens.

Moreover, with the system of Figs. 4, 5 and 6, the mirrors M9 and M11 are so arranged that the screens S and S1 may be at the same height, this being advantageous and desirable under some circumstances.

In Fig. 7, I have illustrated another of the many ways in which the light-reflecting system may be arranged in accordance with my invention. With the arrangement of Fig. 7, the independent light beams are obtained in any suitable manner and they extend approximately in opposite directions and more or less horizontally to the respective mirrors M12 and M13. From the mirror M12, one of the light beams passes more or less vertically to the mirror M14 and thence to the screen S1 while, from the mirror M13, the other light beam passes upwardly to the mirror M15 and then to the screen S.

The mirror systems disclosed in Figs. 1–6, are more or less symmetrical and this is true particularly of the arrangement of Figs. 4, 5 and 6. In Fig. 7, however, the two mirror systems are nonsymmetrical, it often being found desirable to utilize such an arrangement in connection with certain types of installations.

The advantages of my invention are numerous and of importance. Of great utility is the fact that a minimum number of mirrors are employed thereby preventing waste of light and increasing the efficiency of the system. With the arrangement shown, each light-reflecting system includes but three mirrors, the second mirror being utilized to pass the light beam more or less in a vertical direction so that the screens may be disposed well above the projection apparatus and further to permit relatively close spacing of the screens while still obtaining light paths of a desired length.

As has been disclosed, the three-mirror system is very flexible inasmuch as the mirrors may be arranged in a variety of ways to secure a desired arrangement of the screens.

In all of the arrangements heretofore described, the screens are arranged generally in back-to-back relation although said screens may be somewhat out of alinement with each other if desired. With such a screen arrangement, it results that the light beams cross or pass through each other before reaching the respective screens. This is an inherent feature of my invention arising because of the necessary mirror arrangements required to obtain correct disposition of the screen images. It is important because contributing to the compactness of the system. Under some circumstances, however, my invention may be practiced without causing the light beams to cross each other as described above.

With the forms of my invention heretofore described, the projected light beam passes, without reflection, from the source of light to the crossed mirror arrangement, or equivalent. It shall be understood, however, that my invention is not to be limited in this respect since it may be desirable that the projection field together with the tape passing therethrough be positioned otherwise than as heretofore described, in which case, one or more mirrors may be utilized for reflection of the main light beam before the latter comes to the crossed mirror arrangement, or equivalent. With such a system, the three-mirror reflecting systems operate the same as heretofore described, the chief difference involving the reflecting arrangement for the main light beam. It shall be understood, therefore, that, in some broad aspects my invention is applicable to systems wherein the projected light beam is passed through a tape section in a manner otherwise than as herein illustrated.

Figure 8:
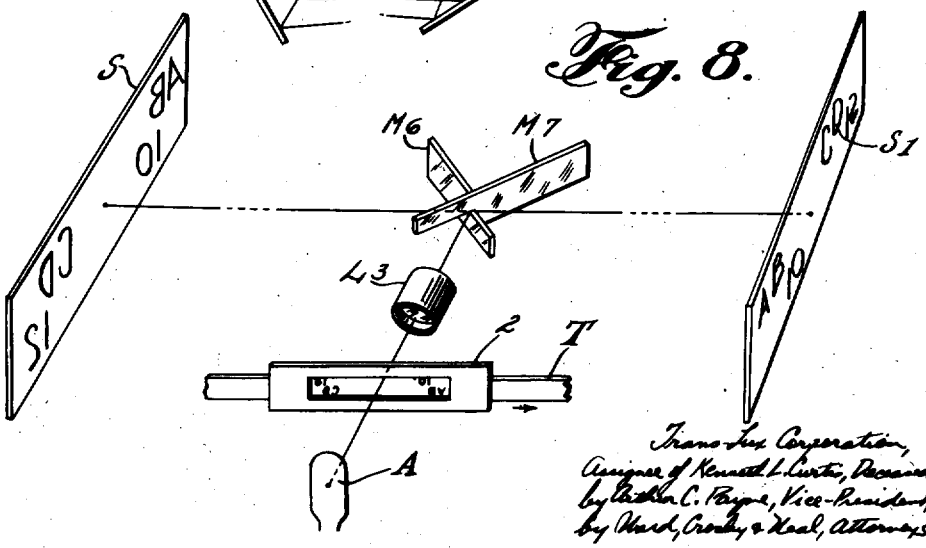
Fig. 8 is a perspective view, with parts omitted, of another form of projection system arranged in accordance with my invention.

Referring to Fig. 8, there is illustrated a form of my invention somewhat different in principle, as regards certain specific aspects, from that heretofore described.

In Fig. 8 the crossed mirror arrangement of Figs. 4 and 6 is shown as disposed beyond the objective lens L3, said crossed mirror arrangement, or equivalent, serving to produce plural, independent light beams from the single projected light beam. In the same sense as heretofore described, the independent light beams may extend laterally with respect to the optical axis of the projected light beam and they may pass, in opposite directions, or approximately so, directly into coacting relation with the respective screens S and S1. In other words, with the form of my invention illustrated in Fig. 8, no mirrors need be interposed between the crossed mirror arrangement and the screens. Therefore, assuming that the objective lens of Fig. 8 is of the same focal character and focussed the same as in Figs. 1–7 inclusive, it follows that the screens S and S1 are necessarily spaced from each other to much greater extent than in Figs. 1–7 inclusive if, in both cases, the image areas on the screens are to be approximately of the same extent.

To the end that the images on the respective screens S and S1 may be upright and in normal, readible relation, it follows that the tape T should be positioned in the projection field defined by the aperture I in different relation than as described in connection with Figs. 1–7. As shown in Fig. 8, the tape T passes horizontally and in edgewise, vertical relation, the ink forming the characters facing the source of light A all the same as heretofore described. However, the tape T of Fig. 8, as will readily appear, is in inverted relation with respect to the position taken thereby in Figs. 1–7 inclusive. That is, the characters on the tape are "upside down" in Fig. 8, whereas in Figs. 1–7 inclusive the tape characters are in normal upright position. Further, in Fig. 8, the tape passes from left to right whereas, with the arrangements heretofore described, the tape passes in reverse direction as the parts are shown on the drawings.

Accordingly, with the tape related to the projection field as shown in Fig. 8, it follows that the images on the respective screens appear in normal, upright position and move in opposite directions thereacross in correspondence with the tape movement.

From many important aspects of my invention, plural screens are utilized as hereinbefore described. It shall be understood, however, that from some aspects my invention is applicable to projection systems involving but one screen and a single light-reflecting system. When plural screens are utilized and as hereinbefore described, they are disposed, ordinarily, in parallel, back-to-back relation in which case, said screens, usually, are in planes crosswise, and more particularly, at right angles with respect to the course taken by the tape while passing through the projection field. It shall be understood, however, that from some aspects of my invention, the screens need not be disposed as described above since, under some circumstances, it may be desirable, as now to be described, to dispose them otherwise than in parallel relation with respect to each other.

Figure 9:
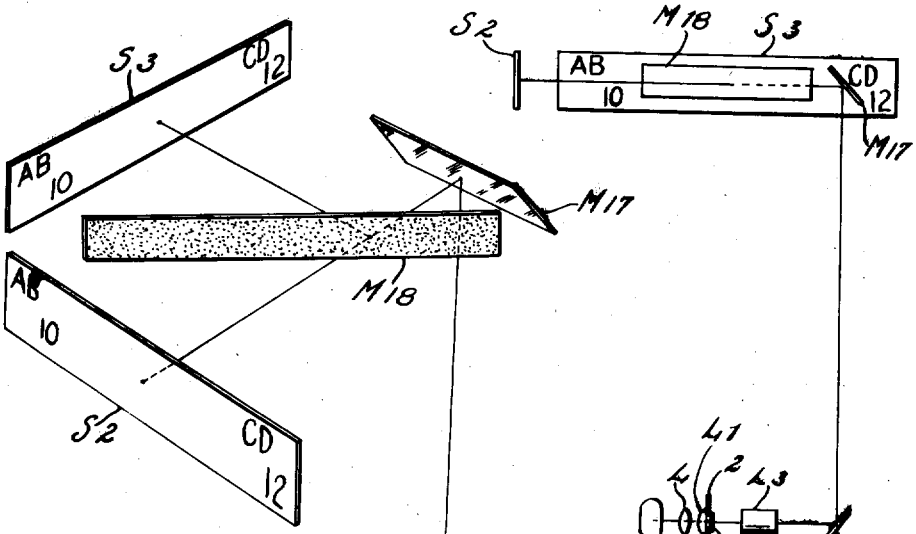
Fig. 9 is a perspective view, with parts omitted, of another form of projection system arranged in accordance with my invention.
Figure 10:
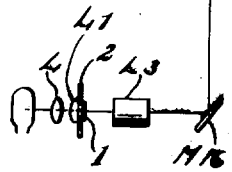
Fig. 10 is a side elevational view of the projection system shown in Fig. 9.
Figure 11:
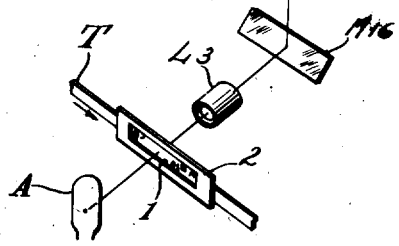
Fig. 11 is a plan view, with parts omitted, of the system shown in Figs. 9 and 10.
Figure 11:
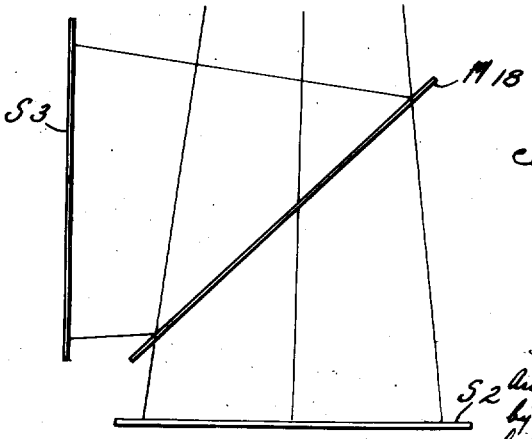

Referring to Figs. 9, 10 and 11, there is illustrated a form of my invention which operates independently of the hereinbefore described crossed mirrors, or equivalent and wherein the screens are disposed in a novel relation. As shown particularly in Figs. 9 and 10, the main projected light beam traverses the objective lens L3, the same as heretofore described, and then coacts with a mirror M16 by which it is reflected upwardly or substantially in a vertical direction, said light beam thereafter coacting with a mirror M17 by which it is deflected so as to pass in a horizontal direction or approximately so.

After leaving the mirror M17, the aforesaid light beam coacts with a mirror M18 which, in accordance with the form of my invention disclosed in Figs. 9, 10 and 11, is arranged at an angle of approximately 45 degrees with respect to the axis of the light beam after leaving the mirror M17, and which is of such character that a part of said light beam passes therethrough and a part is reflected thereby. Accordingly, the part of the light beam traversing the mirror M18 passes therebeyond and coacts with a screen S1 which, obviously, should be disposed upright and at right angles to the axis of said last named light beam. The part of the light beam reflected by the mirror M18 passes at right angles to the axis of the light beam emanating from the mirror M17 and coacts with a screen S3 which, obviously, should be disposed upright and at right angles to the axis of said reflected light beam.

The mirror M18 may be of any suitable character consonant with the function described above. However, ordinarily, said mirror M18 is one whose surface is silvered in substantially a uniform manner, the degree of silvering being such that approximately half of the light is reflected while the other half passes therethrough. However, it shall be understood that the mirror M18 may be of such character that the proportion of reflected and traversing light may be varied otherwise than as stated.

With the form of my invention shown in Figs. 9, 10 and 11, the tape T passes across the projection field in the direction of the arrow, Fig. 9, the inked side of the tape facing the objective lens L3 and the characters being disposed in normal upright position. When the arrangement is as just described, images are produced on the screens S2 and S3 as illustrated in Fig. 9, said images being readable from the front of the screen S2 and from the rear of the screen S3. In other words, the screen S2 is of a character adapting it for "through" projection, the audience viewing that side of said screen opposite the side engaged by the projecting light beam; the screen S3, however, is of a character adapting it for "reflecting" projection, the audience viewing the same side of said screen S3 as is engaged by the projecting light beam.

With the form of my invention thus described in connection with Figs. 9, 10 and 11, the screens S2 and S3 are disposed at right angles to each other, or substantially so, in contra-distinction to the forms of my invention described in Figs. 1 through 8 inclusive, wherein the respective screens are disposed substantially in parallel relation. The right angular relation of the screens S2 and S3 is desirable under some circumstances in order to meet conditions imposed by the arrangement of offices, rooms or the like wherein the projection system is to be installed.

With the forms of my invention illustrated by Figs. 4, 5, 6 and 8, the crossed mirrors M6 and M7 were described as being disposed, preferably, at angles of 45 degrees, respectively, with respect to the axis of the main light beam traversing the objective lens L3, from which it follows that the mirrors M6 and M7 are disposed at right angles with respect to each other. Under such circumstances and with the disclosed reflecting systems, it resulted that the respective screens are disposed approximately in parallel back-to-back relation.

With the form of my invention disclosed in Figs. 12, 13 and 14, the aforesaid relation of the crossed mirrors M6 and M7, with respect to each other and with respect to the axis of the main light beams traversing the objective lens L3, is changed from that heretofore described, and as particularly illustrated in said Figs. 12, 13 and 14, the mirrors M6 and M7 are arranged, respectively, at angles of approximately 67½ degrees with respect to the axis of the main light beam traversing the objective lens L3; in other words, said mirrors M6 and M7 of Figs. 12, 13 and 14 are arranged obliquely with respect to each other instead of at right angles.

Accordingly, where the mirrors M6 and M7 are arranged as just described, the light beams reflected, respectively, thereby pass no longer substantially at right angles with respect to the axis of the main light beam traversing the lens L3 but are related at acute angles with respect thereto.

As shown, the light beam reflected by the mirror M6 passes more or less horizontally to a mirror M20 and then more or less vertically to a mirror M21, the light beam from the latter coacting with a screen S4. In a similar manner, the light beam reflected by the mirror M7 passes approximately in a horizontal direction to a mirror M22 and then approximately vertically to a mirror M23, the light beam passing from the latter to a screen S5.

In Fig. 12, the tape T is shown as passing horizontally through the projection field in edgewise vertical relation, the characters thereon being in normal upright relation and the inked taped surfaces facing the source of light A. Where this relation obtains and with the described mirror system, the screens S4 and S5 are adapted for "through" projection, the respective sets of images being readable in their normal upright relation when said screens are vertically disposed and viewed from the respective sides opposite to those engaged by the projecting light beams, respectively.

With the arrangement shown in Figs. 12, 13 and 14, the screens S4 and S5 are disposed at right angles with respect to each other, the same as described in connection with Figs. 9, 10 and 11 with the exception that in Figs. 12, 13 and 14 both of the screens are adapted for "through" projection.

The right angular relation of the screens S4 and S5 results from the described angular relation of the mirrors M6 and M7 with respect to each other and with respect to the axis of the main light beam traversing the lens L3. In this connection, it shall be understood that the mirrors M6 and M7 of Figs. 12, 13 and 14 may be obliquely related to each other differently than as hereinbefore described in order to obtain a relation of screens wherein they are neither parallel nor perpendicular to each other.

Although the form of my invention of Figs. 12, 13 and 14 has been described with reference to the crossed mirrors M6 and M7, it shall be understood that the invention is not to be so limited because, if desired, the arrangement for obtaining the independent light beams may be otherwise such, for example, as shown with the individual mirrors M and M1 of Figs. 1 and 3, provided that said individual mirrors are properly related in angular relation to the axis of the main projected light beam.

With the forms of my invention hereinbefore described, a single objective lens is utilized, the independent light beams being obtained from the light beam traversing said objective lens. Obviously, under such circumstances, the lengths of the light paths from the objective lens to the respective screens should be equal in order that there shall be sharp definition of images. Ordinarily, my invention is practiced in connection with a single objective lens but, as regards certain features thereof, the invention is not to be thus limited since, under some circumstances, it may be desirable to utilize a plurality of objective lenses to obtain the independent light beams.

As hereinbefore described, the tape T is of the transparent or semi-transparent type, the light beam passing therethrough in order to reach the objective lens. As well, however, as regards certain aspects of my invention, the tape T may be of the opaque type in which case the projection is of the character known as "reflecting".

In the description of my invention as heretofore stated, the light-reflecting members have been described as "mirrors". It shall be understood that these mirrors may be of the conventional type and that prisms or other mirror equivalents may be utilized in lieu thereof. Accordingly, in the appended claims, the term "mirror" shall be understood as having a generic meaning and including mirrors, prisms or the like.

In its preferred arrangements, my invention is practiced in connection with ordinary ticker tape. It shall be understood, however, that as regards certain broad aspects thereof, the invention is not to be limited to the utilization of ticker tape since other character-bearing surfaces, members or slides may be substituted therefor, the latter being disposed in or passing through the projection field automatically or by manual action as may be desired. Accordingly, in the appended claims, the term "tape" shall be understood as having a generic meaning.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection system, the combination with a projection field along which is movable a tape having characters reading lengthwise thereof, of a screen disposed in a plane extending cross-wise with respect to the course taken by the tape while moving through said projection field, and means comprising a light-reflecting system for producing on said screen character images which travel horizontally from end to end thereof substantially at right angles with respect to the plane of the tape section in said projection field.

2. In a projection system, the combination with a projection field along which a character-bearing tape is horizontally movable while disposed edgewise, of a screen disposed in a plane extending cross-wise with respect to the course taken by the tape while moving through said projection field, and means comprising a light-reflecting system for producing images of the tape characters on said screen.

3. In a projection system, the combination with a projection field along which a character-bearing tape is horizontally movable while disposed edgewise, of a screen disposed in a plane extending cross-wise with respect to the course taken by the tape while moving through said projection field, and means comprising a light-reflecting system for producing on said screen character images which travel from end to end thereof substantially at right angles with respect to the plane of the tape section in said projection field.

4. In a projection system, the combination with a projection field along which a character-bearing tape is horizontally movable while disposed edgewise, and an objective lens traversed by a light beam passing from said projection field along a path, of a mirror for deflecting said light beam laterally with respect to said path, a screen disposed in a plane extending cross-wise with respect to the course taken by the tape while moving through said projection field, and means for passing the deflected light beam into engagement with said screen.

5. In a projection system, the combination with a projection field for a character-bearing tape, and an objective lens traversed by a light beam passing from said projection field, of means for obtaining a plurality of independent light beams from said first named light beam, a plurality of spaced screens, and means comprising duplicate light-reflecting systems for producing images of the characters on the respective screens.

6. In a projection system, the combination with a projection field for a character-bearing tape, and an objective lens traversed by a light beam passing from said projection field, of means for obtaining a plurality of independent light beams from said first named light beam, a plurality of spaced screens disposed, respectively, in planes extending crosswise with respect to the course taken by the tape while moving through said projection field, and means comprising duplicate light-reflecting systems for producing images of the characters on the respective screens.

7. In a projection system, the combination with a projection field for a character-bearing tape, and an objective lens traversed by a light beam passing from said projection field, of means for obtaining a plurality of independent light beams from said first named light beam, a plurality of spaced screens, and means comprising duplicate light-reflecting systems for producing normal upright images of the characters on the respective screens, each light-reflecting system, beyond said objective lens, having less than four mirrors.

8. In a projection system, the combination with a projection field along which a character-bearing tape is horizontally movable while disposed edgewise, and an objective lens traversed by a light beam passing horizontally from said projection field, of means for obtaining a plurality of independent light beams from said first named light beam, a plurality of spaced screens, and means comprising duplicate light-reflecting systems for producing images of the characters on the respective screens.

9. In a projection system, the combination with a projection field for a character-bearing tape, and an objective lens traversed by a light beam passing from said projection field along a path, of means disposed in a horizontal section of said path for obtaining a plurality of independent light beams from said first named light beam, said independent light beams extending laterally from the horizontal section of said path, and a plurality of screens with which said independent light beams coact respectively.

10. In a projection system, the combination with a projection field for a character-bearing tape, and an objective lens traversed by a light beam passing from said projection field, of means for obtaining a plurality of independent light beams from said first named light beam, a plurality of spaced screens, and reflecting means for passing said independent light beams, respectively, into engagement with said screens, said reflecting means causing said light beams to cross each other while passing toward the respective screens, whereby normal upright images are obtained on said screens.

11. In a projection system, the combination with a projection field for a character-bearing tape, and an objective lens traversed by a light beam passing from said projection field, of means for obtaining a plurality of independent light beams from said first named light beam, a plurality of spaced screens, and reflecting means for passing said independent light beams, respectively, into engagement with said screens, said reflecting means causing said independent light beams to twice pass approximately in opposite directions before engaging the respective screens.

12. In a projection system the combination with a projection field along which a character-bearing tape is movable, and an objective lens traversed by a light beam passing from said projection field, of means for obtaining a plurality of independent light beams from said first named light beam, a plurality of spaced vertical screens disposed, respectively, in planes extending crosswise with respect to the course taken by the tape while moving through said projection field, and reflecting means for passing said independent light beams, respectively, into engagement with said screens, said reflecting means causing said light beams to cross each other while passing toward the respective screens, whereby normal upright images are obtained on said screens.

13. In a projection system, the combination with a projection field for a character-bearing tape, and an objective lens traversed by a light beam passing from said projection field, of means for obtaining a plurality of independent light beams from said first named light beam, a plurality of spaced screens, and means comprising duplicate light-reflecting systems for producing normal upright images of the characters on the respective screens, each light-reflecting system, beyond said objective lens, having less than three mirrors.

14. In a projection system, the combination with a projection field for a character-bearing tape, and an objective lens traversed by a light beam passing from said projection field, of means for obtaining a plurality of independent light beams from said first named light beam, a plurality of spaced screens, and means comprising duplicate light-reflecting systems for producing normal upright images of the characters on the respective screens, each light-reflecting system, beyond said objective lens, having but one mirror.

15. In a stock quotation projecting machine having a ticker adapted to mark and discharge tape with reading matter readable longitudinally of the tape, the combination with a pair of independent and separated elongated narrow daylight display screens disposed in substantially parallel back-to-back relation, of a projecting device removed from said screens through which device the marked tape passes, said device including a source of light, an elongated light aperture along which the tape passes to receive the light rays from said source of light and form images of the markings on said tape, said light aperture having its longer dimension disposed transversely of the planes of said screens and said tape following the course defined by said light aperture whereby the path of tape movement is transversely disposed with respect to the planes of said screens, means for splitting said light rays into two subordinate beams after passing through said tape, and sets of reflectors so arranged as to direct said last-named beams toward and onto said screens respectively so as to produce erect and uninverted images on each screen movable and readable longitudinally of such screen.

16. In a projection system, the combination with a character bearing tape disposed in a projection field with the plane of the tape extending substantially vertically, the characters being placed on said tape in such manner that, while the tape is in said projection field, said characters are in horizontal rows, of a screen disposed in a plane extending crosswise with respect to the course taken by the tape while moving through said projection field, a source of light from which a projecting light beam passes to said screen, and means for producing images of the tape characters on said screen, said second named means producing on said screen images of said characters which are normally upright, disposed in horizontal rows and movable across said screen in correspondence with movement of the tape.

17. In a projection system, the combination with a character-bearing tape disposed in a projection field with the plane of the tape extending substantially vertically, the characters being placed on said tape in such manner that they are in horizontal rows while the tape is in said projection field, of a plurality of separate screens disposed in back-to-back relation or substantially so, light-producing means from which light beams pass to the respective screens, and means for producing images of the tape characters on said screens, said last named means producing on said screens images of said characters which are normally upright, disposed in horizontal rows and movable across said screens in correspondence with movement of the tape.

18. In a projection system, the combination with a character-bearing tape disposed in a projection field with the plane of the tape extending substantially vertically, the characters being placed on said tape in such manner that, while the tape is in said projection field, said characters are in horizontal rows, of a plurality of separate screens disposed in back-to-back relation or substantially so, light-producing means from which light beams pass to the respective screens, and means comprising light-reflecting systems for producing images of the tape characters on said screens, said last named means producing on said screens images of said characters which are normally upright, disposed in horizontal rows and movable across said screens in correspondence with movement of the tape.

19. In a projection system, the combination with a character-bearing tape disposed in a projection field with the plane of the tape extending substantially vertically, the characters being placed on said tape in such manner that they are in horizontal rows while the tape is in said projection field, of a plurality of separate screens spaced from each other, at least one of said screens being disposed in a plane extending crosswise with respect to the course taken by the tape while moving through said projection field, light-producing means from which light beams pass to the respective screens, and means for producing images of the tape characters on said screens, said last named means producing on said screens images of said characters which are normally upright, disposed in horizontal rows and movable across said screens in correspondence with movement of the tape.

20. In a projection system, the combination with a character-bearing tape disposed in a projection field with the plane of the tape extending substantially vertically, the characters being placed on said tape in such manner that, while the tape is in said projection field, said characters are normally upright and in horizontal rows, of a plurality of spaced, vertical screens disposed, respectively, in planes substantially at right angles to the plane of the tape section in said projection field, light-producing means from which light beams pass to the respective screens, and means comprising light-reflecting systems for producing images of the tape characters on said screens, said last named means producing on said screens images of said characters which are normally upright, disposed in horizontal rows and movable across said screens in correspondence with movement of the tape.

21. In a projection system, the combination with a character-bearing tape disposed in a projection field with the plane of the tape extending substantially vertically, the characters being placed on said tape in such manner that they are in horizontal rows while the tape is in said projection field, of a plurality of separate rear projection screens spaced from each other, at least one of said screens being disposed in a plane extending crosswise with respect to the course taken by the tape while moving through said projection field, light-producing means from which light beams pass to and through the respective screens, and means for producing images of the tape characters on the front faces of the respective screens, said last named means producing on said screens images of said characters which are normally upright, disposed in horizontal rows and movable across said screens in correspondence with movement of the tape.

22. In a projection system, the combination with a character-bearing tape disposed in a projection field with the plane of the tape extending substantially vertically, the characters being placed on said tape in such manner that, while the tape is in said projection field, said characters are normally upright and in horizontal rows, of a plurality of spaced, vertical, rear projection screens disposed, respectively, in planes substantially at right angles to the plane of the tape section in said projection field and in back-to-back relation or approximately so, light-producing means from which light beams pass to and through the respective screens, and means comprising light-reflecting systems for producing images of the tape characters on the front faces of the respective screens, said last named means producing on said screens images of said characters which are normally upright, disposed in horizontal rows and movable across said screens in correspondence with movement of the tape.

23. In a projection system, the combination with a character-bearing tape disposed in a projection field with the plane of the tape extending substantially vertically, the characters being placed on said tape in such manner that they are in horizontal rows while the tape is in said projection field, of a pair of separate screens disposed in back-to-back relation or substantially so, a pair of mirrors, light-producing means from which light beams pass to the respective mirrors and from thence to said screens respectively, and objective lens means for producing on said screens images of the tape characters which are normally upright, disposed in horizontal rows and movable across said screens in correspondence with movement of the tape, the respective amounts of light passing to said mirrors being variable as desired.

TRANS-LUX CORPORATION,
*Assignee of Kenneth L. Curtis, Deceased,*
By ARTHUR C. PAYNE,
*Vice-President.*